United States Patent [19]

Matsuoka et al.

[11] 4,314,178
[45] Feb. 2, 1982

[54] LOW-ENERGY-ELECTRON-EXCITING FLUORESCENT DISPLAY DEVICE

[75] Inventors: Tomizo Matsuoka, Neyagawa; Tsuneharu Nitta, Katano; Shigeru Hayakawa, Hirakata, all of Japan

[73] Assignee: Matsushita Electric Industrial Co., Ltd., Japan

[21] Appl. No.: 225,323

[22] Filed: Jan. 15, 1981

Related U.S. Application Data

[63] Continuation of Ser. No. 55,193, Jul. 2, 1979, abandoned.

[30] Foreign Application Priority Data

Jul. 4, 1978 [JP] Japan .................................. 53-81810

[51] Int. Cl.$^3$ ............................................ C09K 11/465
[52] U.S. Cl. ................................ 313/497; 252/301.4 F
[58] Field of Search ................. 252/301.4 F; 313/495, 313/496, 497

[56] References Cited

FOREIGN PATENT DOCUMENTS 51-71285  6/1976  Japan ........................... 252/301.4 F

OTHER PUBLICATIONS

Matsuoka et al., "J. Electrochem. Soc.", vol. 125, No. 1, pp. 102–106.

Primary Examiner—Jack Cooper
Attorney, Agent, or Firm—Wenderoth, Lind & Ponack

[57] ABSTRACT

A red emission fluorescent display device employing improved $SnO_2$:Eu phosphor as a low-energy-electron excitation phosphor. The phosphor is manufactured by the following steps:

To a starting material selected from the group consisting of at least one of metallic tin, stannous and stannic halide and stannous sulfate, europium oxide is added in the amount of $5 \times 10^{-2}$ to 10 atomic % europium to tin. The mixture is heated and stirred with nitric acid until it becomes dry due to evaporation of the solvent water and unreacted nitric acid, thereby forming a mixed powder of metastannic acid and europium. Then the powder is subjected to heat treatment, causing the metastannic acid to thermally decompose and the europium to diffuse into the stannic oxide matrix.

The device exhibts remarkably high luminescence intensity and it is possible to achieve the intensity of 26f.L or more under the $E_b$ of 10 V and the $I_b$ of 1.5 mA/cm$^2$.

1 Claim, 3 Drawing Figures

LOW-ENERGY-ELECTRON-EXCITING FLUORESCENT DISPLAY DEVICE

This is a continuation of Ser. No. 55,193, filed July 2, 1979, now abandoned.

BACKGROUND OF THE INVENTION

This invention relates to a fluorescent display device having a low energy electron excitation phosphor and more particularly pertains to such device in which $SnO_2$:Eu is employed as a phosphor for emitting red fluorescent rays.

A fluorescent display device having a low energy electron excitation phosphor basically has the structure of a modified triode vacuum tube, in which the phosphor coated on a anode plate fluoresces due to bombardment of electrons emitted from a cathode heated at subluminous temperature. The electron bombardment is controlled by a grid.

Such device has the following features: Its power dissipation is quite low, being about one-half to two-thirds of a LED and it has a simpler and more easily producible structure than the LED. Further it is superior to a liquid-crystal device because of self-glowing characteristics which makes the device visible in a dark place.

Therefore, the vacuum fluorescent device has flourished as a dot-matrix alphanumeric device which is assembled in, for example desktop calculators.

As the low energy electron excitation phosphor, only ZnO:Zn has been popular. It emits blue-green rays. However for enabling more complex displays, it has been desired to make available another-color-ray emitting phosphor.

$SnO_2$:Eu phosphor was invented for such purpose and emits red rays having the spectrum shown in FIG. 1 when excited by electron beams or ultraviolet rays. This phosphor exhibits a dead voltage of 5 V which is as low as that of ZnO:Zn phosphor. Thus $SnO_2$:Eu phosphor is the first red ray emitting and low energy electron excitation phosphor which is satisfactory in performance and reliability for commercial use.

The $SnO_2$:Eu phosphor has hitherto been produced by the following process:

Mixed aqueous solution of stannous chloride and europium chloride is prepared and ammonia solution is added thereto until pH of the mixed solution becomes to 8.5, thereby forming hydroxide coprecipitate. By drying and heat-treating the coprecipitate, $SnO_2$:Eu phosphor is obtained. This hydroxide coprecipitate, however, has very small particle size of 0.01 $\mu$m and because of its large apparent specific volume due to such extremely small particle size, it is difficult to handle in the manufacturing process. This coprecipitate has a further disadvantage that it easily changes to $SnO_2$ in the drying step, resulting in the decrease of reaction activity in the following heat treatment. As the result of those disadvantages, the obtained phosphor exhibits unsatisfactory performance for the commercial use of the red emission fluorescent vacuum display device.

Another method is as follows:

Oxalate coprecipitate is made by rapidly mixing stannous chloride and europium chloride aqueous or alcohol mixed solution, with the aqueous solution including oxalic ions. The phosphor is obtained as the result of thermal decomposition of the coprecipitate. The oxalate coprecipitate has a dendrite-like particle configuration and thus, the resulting phosphor hardly has particle size more than 1.5 $\mu$m and does not emit a glow of satisfactory intensity. Further such oxalate coprecipitate has a disadvantage in that it thermally decomposes so rapidly during the heat treatment that there are yielded CO and $CO_2$ gases, resulting in the self-spouting phenomenon from a container.

SUMMARY OF THE INVENTION

It is an object of the present invention to provide a low-energy-electron-exciting fluorescent display device with red emission having improved high luminescence intensity.

According to one preferred embodiment of the invention, the fluorescent display device is composed of an anode coated with $SnO_2$:Eu powder phosphor, a cathode for thermoelectronic emission source confronting said anode, a mesh grid located between said anode and said cathode, and a glass tube for sealing said components in vacuum, wherein the phosphor is manufactured by the following steps:

As a starting material at least one material is selected from metallic tin, stannous and stannic halide and stannous sulfate. Europium oxide is added to the starting material in an amount such that the ratio of europium to tin is $5 \times 10^{-2}$ to 10 atomic %. The mixture is heated and stirred with nitric acid until it becomes dry due to evaporation of the solvent water and unreacted nitric acid, thereby forming a powder of metastannic acid admixed with europium. Then the powder is subjected to heat treatment, causing the metastannic acid to be thermally decomposed and the europium to be diffused into stannic oxide matrix.

DETAILED DESCRIPTION OF THE INVENTION

Figure 1:
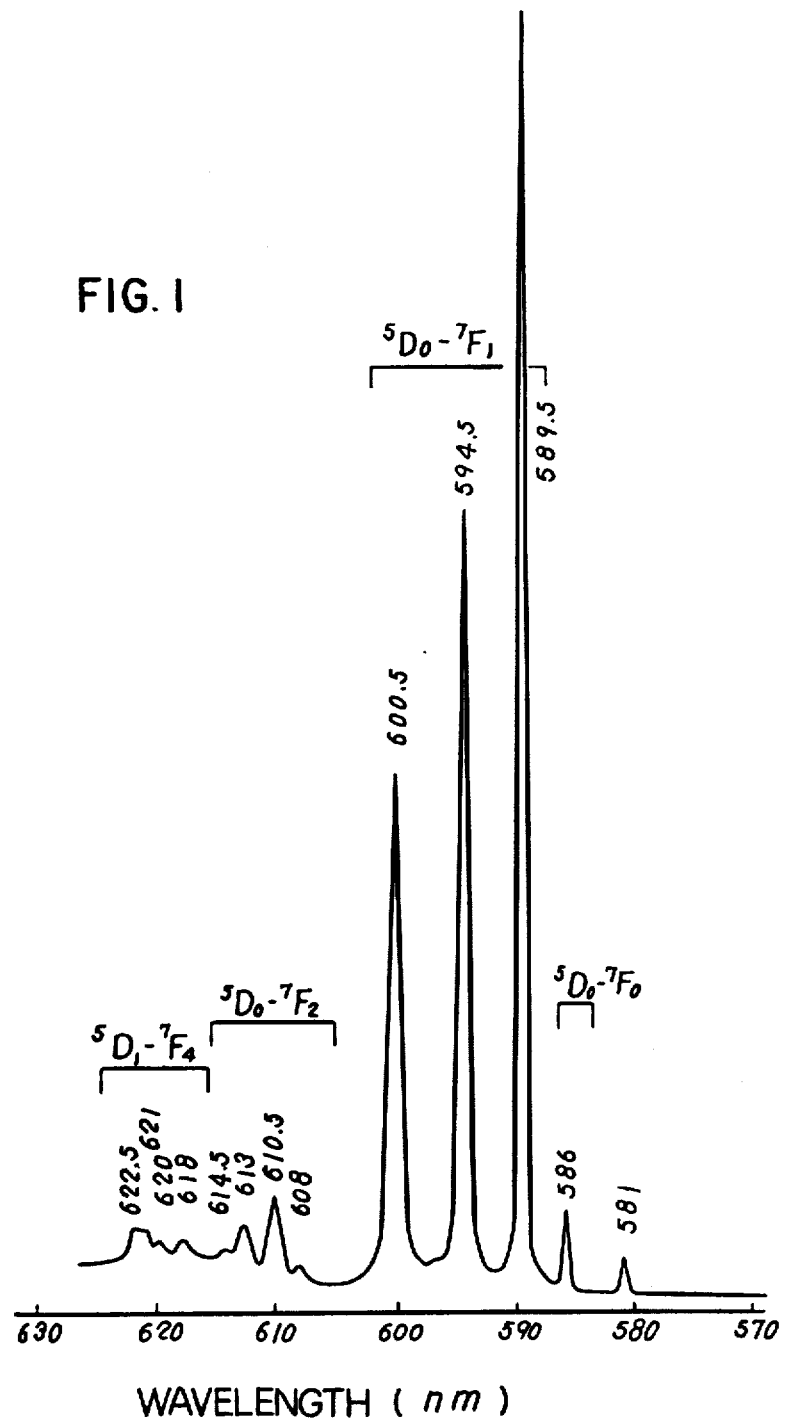
FIG. 1 is a graph showing the cathode luminescence spectrum of $SnO_2$:Eu phosphor.
Figure 2:
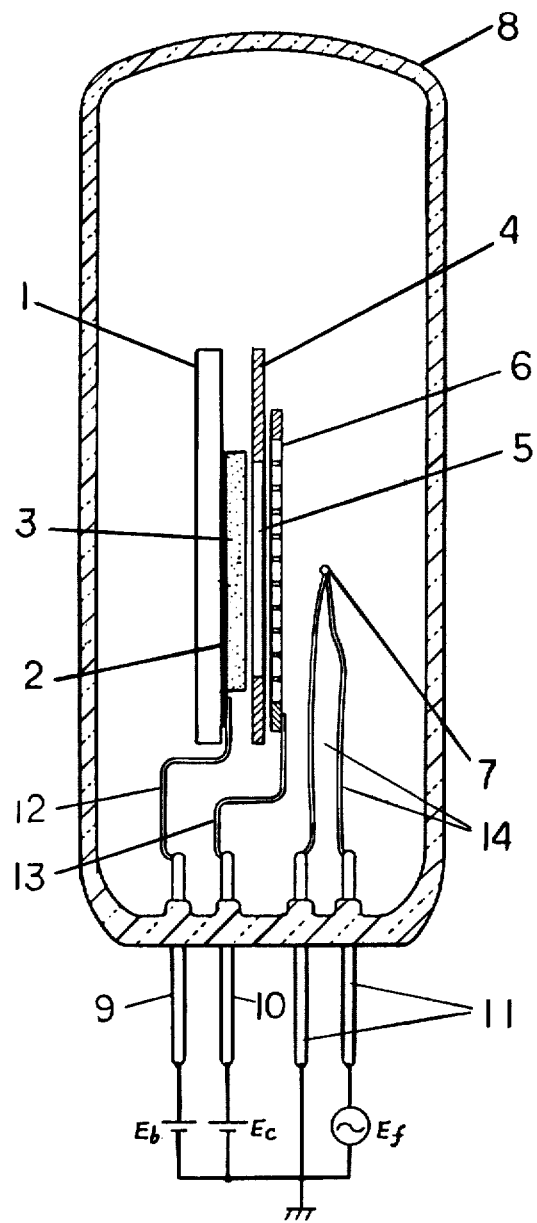
FIG. 2 is a schematic view of a low-energy electron exciting fluorescent display device according to the invention.
Figure 3:
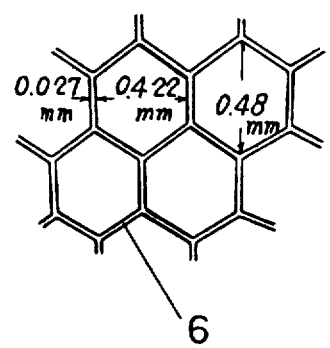
FIG. 3 is a enlarged view of a control grid of the device illustrated in FIG. 2.

Referring to FIG. 2, numeral 1 represents a glass substrate with a transparent anode 2 deposited thereon. On the anode 2 is coated a phosphor layer 3 at 3 mg/cm$^2$. The phosphor layer 3 is deposited by sedimentation. A mica plate 4 having a 5×5 mm. aparture 5 of a size of 5×5 mm is provided, confronting with the phosphor layer 3 and being parallel to the substrate 1. A grid 6 is provided in parallel to the mica plate 4 and in front of the mica plate 4 on the opposite side of the substrate 1. This grid 6 has a honeycomb structure as shown in FIG. 3. As a thermoelectric emission source, a hot cathode 7 with a wire structure is provided in front of the grid on the opposite side of the anode substrate 1. These components are sealed in vacuum by a glass tube 8. The anode 2, grid 6 and cathode 7 are connected to terminals 9, 10 and 11 by leads 12, 13 and 14, respectively. $E_b$, $E_c$ and $E_f$ represent electric sources. The substrate 1, mica plate 4, grid 6 and cathode 7 are supported in the usual manner, but the supporting structure is omitted from the illustration.

The phosphor layer 3 is of improved quality and the examples of its preparation are described hereinafter.

<Example 1>

Mixtures of metallic tin and europium oxide $Eu_2O_3$ were prepared by adding $Eu_2O_3$ to 47.5 grams of metallic tin so that the ratio of europium atoms to tin atoms was $1\times10^{-2}, 5\times10^{-2}, 1\times10^{-1}, 1, 10$ and $10$ atomic%. Each mixture was put into a vitreous quartz beaker and 250 cc of 8 normal nitric acid was added thereto. Then it was heated and stirred at the same time on a magnetic stirrer with a hot-plate, whereby metastannic acid precipitate was formed. The precipitate was dried by evaporating solvent water and unreacted nitric acid. Thus dried precipitate was slightly remixed and pulverized, then transferred to an alumina crucible with cover and heated at the temperature of 1200° to 1500° C. for 2 to 10 hours.

<Example 2>

The mixtures of the following combination were prepared.

(1) 90.3 grams of $SnCl_2.2H_2O$ and 0.70 grams of $Eu_2O_3$ (2) 111.4 grams of $SnBr_2$ and 0.70 grams of $Eu_2O_3$ (3) 85.9 grams of $SnSO_4$ and 0.70 grams of $Eu_2O_3$ Each combination of amounts is in such ratio that europium is contained at 1 atomic% with respect to Sn atoms. The mixture was subjected to the same processes as the Example 1, in which the last heat treatment was performed at the temperature of 1350° C. for 2 hours.

The phosphors produced by the above-mentioned example were examined for light emitting characteristics under low energy electron excitation. The measurement was performed by the use of the device illustrated in FIG. 2 and under the grid voltage $E_c$ of 18 v, the filament voltage $E_f$ of 3 V, and the anode voltage $E_b$ of 10 V. The results are shown in the following Table.

as a starting material for Sn. It is also possible to use a mixture of two or more of those compounds and metallic tin as starting materials. With respect to the heat treatment condition, it is understood from the comparison of the sample No. 1 to 6 and 9 to 12 with the sample No. 7 and 8 that the phosphor which is subjected to the heat treatment at about 1200° C. does not exhibit a large luminescence intensity compared with the phosphor which is treated at more than 1300° C. The sample 8 shows that the intensity is increased by heating longer time. Practically it is convenient to perform the heat treatment at more than 1300° C. It is a matter of course that the temperature must be lower than the melting point of $SnO_2$. It was confirmed that a similar result was also achieved in case where stannic halide or stannic sulfate was used instead of stannous halide or stannous sulfate in the above-mentioned Examples.

The phosphors of the samples have a large particle size of 2 μm or more which is remarkably larger than hitherto known $SnO_2$:Eu phosphor.

The method described above has further features with regard to facility of manufacture. In this method since there is caused neither rapid decomposition-gas-spouting nor thermal shock by the decomposition and an oxidation of tin ions, the step for only thermal decomposition is not necessary and the metastannic acid can be directly heated at above 1200° C. by using an alumina crucible with cover, causing thermal decomposition and diffusion of europium. Further, most kinds of tin ingredients such as stannous halides or sulfate, stannic chloride and metallic tin are available for this method. Especially the use of metallic tin is most practical since high purity material is easily obtainable. It is advantageous for manufacturing high grade phosphor. By using metallic tin with 5-nine purity, the phosphor with the luminescence intensity of 33 f.L under $E_b=10$

TABLE

| Sample No. | Example | Starting Material | Eu addition (atomic % to tin) | heat treatment Temperature (°C.) | Time (hr) | particle size of phosphor (μm) | Luminescence intensity under $E_b$ = 10V and $I_b$ = 1.5mA/cm² (f.L) |
|---|---|---|---|---|---|---|---|
| 1 | 1 | Sn metal | $1\times10^{-2}$ | 1300 | 2 | 3 | 18 |
| 2 | 1 | Sn metal | $5\times10^{-2}$ | 1300 | 2 | 3 | 26 |
| 3 | 1 | Sn metal | $1\times10^{-1}$ | 1300 | 2 | 3 | 28 |
| 4 | 1 | Sn metal | 1 | 1300 | 2 | 3 | 33 |
| 5 | 1 | Sn metal | 10 | 1300 | 2 | 3 | 28 |
| 6 | 1 | Sn metal | 15 | 1300 | 2 | 3 | 21 |
| 7 | 1 | Sn metal | 1 | 1200 | 2 | 2 | 16 |
| 8 | 1 | Sn metal | 1 | 1200 | 10 | 2 | 20 |
| 9 | 1 | Sn metal | 1 | 1500 | 2 | 3.5 | 35 |
| 10 | 2 | $SnCl_2$ | 1 | 1350 | 2 | 3 | 32 |
| 11 | 2 | $SnBr_2$ | 1 | 1350 | 2 | 3 | 30 |
| 12 | 2 | $SnSO_4$ | 1 | 1350 | 2 | 3 | 30 |
| 13 | 2 | $SnCl_4$ | 1 | 1350 | 2 | 2 | 29 |

The data for the luminescence intensity in the Table are normalized to those at $I_b=1.5$ mA/cm² since the thermoelectronic emission of the hot cathodes is different for different devices and the luminescence intensity is proportional to excitation current density.

As is clear from the results of the sample Nos. 1 to 6, when Sn metal is used as a starting material, the luminescence shows large intensity of 25 f.L or more in the range of Eu content from $5\times10^{-2}$ to 10 atomic% to tin. Because hitherto obtained $SnO_2$:Eu phosphors have exhibited a luminescence intensity less than 16 f.L, the intensity of these samples is remarkably high. The samples 10 to 12 show that satisfactory results are also achieved by using a stannous halide or stannous sulfate V and $I_b=1.5$ mA/cm² could be obtained.

As for the fluorescent device according to the invention, the aging characteristics were examined under the condition of $E_b=18$ V and $E_f=4.5$ V. The data show that after 3,000 hours running the luminescence intensity drift was within 10%. This means satisfactory reliability for practical use.

What is claimed is:

1. A low-energy-electron-exciting fluorescent display device comprising an anode coated with $SnO_2$:Eu powder phosphor, a cathode as a thermoelectronic emission source confronting said anode, a mesh grid located between said anode and cathode, and a glass tube for sealing said components in vacuum, wherein Eu content in said phosphor is such that the quantity of Eu based on the amount of Sn present is $5 \times 10^{-2}$ to 10 atomic % and the phosphor is prepared by the steps comprising:

(a) admixing a material comprising at least one member selected from the group consisting of metallic tin, stannous halides, stannic halides and stannous sulfate; with an additive which includes europium in such amount that the quantity of europium based on the amount of tin present is $5 \times 10^{-2}$ to 10 atomic %;

(b) simultaneously heating and stirring the mixture of step (a) with nitric acid until it becomes dry through evaporation, thereby forming a mixed powder of metastannic acid and europium; and then (c) subjecting the powder to heat treatment at a temperature in the range of from 1300° to below the melting temperature of stannic oxide, causing the metastannic acid to be thermally decomposed to stannic oxide and the europium to be diffused into said stannic oxide, whereby the phosphor exhibits a luminescence intensity more than 25 f.L when excited by 1.5 mA/cm$^2$ of electrons with an anode voltage of 10 V.

* * * * *